United States Patent
Vorage et al.

(10) Patent No.: US 6,274,105 B1
(45) Date of Patent: Aug. 14, 2001

(54) PROCESS FOR PRODUCING HIGH-PURITY POTASSIUM SALTS

(75) Inventors: Marcus Vorage, CH Assen (NL); Per Eichner, Hvidovre (DK)

(73) Assignees: Avebe B.A., Veendam (NL); Kemira Agro Oy, Helsinki (FI)

(*) Notice: Subject to any disclaimer, the term of this patent is extended or adjusted under 35 U.S.C. 154(b) by 0 days.

(21) Appl. No.: 09/194,903
(22) PCT Filed: Jun. 12, 1997
(86) PCT No.: PCT/FI97/00372
§ 371 Date: Dec. 4, 1998
§ 102(e) Date: Dec. 4, 1998
(87) PCT Pub. No.: WO97/47559
PCT Pub. Date: Dec. 18, 1997

(30) Foreign Application Priority Data

Jun. 13, 1996 (FI) .......................................................... 962451

(51) Int. Cl.[7] .............................. C01D 9/04; C01D 13/00
(52) U.S. Cl. ................................. 423/181; 71/34; 71/58; 423/312; 423/395; 426/478
(58) Field of Search ................................. 71/23, 24, 32, 71/33, 34, 37, 39, 41, 58, 59, 61, 48; 423/181, 179, 182, 202, 395, 312; 426/478

(56) References Cited

U.S. PATENT DOCUMENTS 3,993,466   11/1976   Knudsen .
4,002,455 * 1/1977 Arion .......................................... 71/1
4,069,033 * 1/1978 Baldassari ................................ 71/25
5,110,578 * 5/1992 Abidaud ................................ 423/202

FOREIGN PATENT DOCUMENTS 1 2027064   4/1991   (CA) .
1 062231    7/1959   (DE) .
1 812403    6/1970   (DE) .
0 230355    7/1987   (EP) .

OTHER PUBLICATIONS

Kirk–Othmer, Encyclopedia of Chemical Technology, 1981, Third Edition vol. 13, p. 703.*

* cited by examiner

Primary Examiner—Wayne Langel
(74) Attorney, Agent, or Firm—Birch, Stewart, Kolasch & Birch, LLP

(57) ABSTRACT

The present invention relates to a new selective process for producing high-purity potassium nitrate or potassium phosphate. The process uses a liquid agricultural or fermentation by-product, such as molasses, vinasse or potato thick juice as its potassium source and comprises the following unit operations: clarification, ion exchange, neutralization, concentration and crystallization. Importantly, the present invention also concerns a process for producing an ingredient for animal feed, said ingredient having a reduced potassium content.

12 Claims, 3 Drawing Sheets

PROCESS FOR PRODUCING HIGH-PURITY POTASSIUM SALTS

This application is the national phase under 35 U.S.C. §371 of prior PCT International Application No. PCT/FI97/00372 which has an International filing date of Jun. 12, 1997 which designated the United States of America.

The present invention relates to the production of high-purity potassium salts from liquid agricultural or fermentation by-products. The present invention concerns, in particular, a new and selective process for producing high-purity potassium nitrate ($KNO_3$) or potassium phosphate ($KH_2PO_4$) from liquid agricultural or fermentation by-products, such as cane molasses, beet molasses, vinasse, potato thick juice, brown juice from grass etc. The inventive process comprises the following unit operations: ion exchange, neutralization, concentration and crystallization. Importantly, this invention also comprises a process for producing an ingredient for animal feed with reduced potassium content.

BACKGROUND OF THE INVENTION

High-purity potassium nitrate or potassium phosphate is used in horticultural or technical applications. Its purity should be above 97% based on dry matter.

The easiest way to produce high-purity potassium nitrate or potassium phosphate is to use a neutralization process involving potassium hydroxide and the corresponding mineral acid (nitric acid or phosphoric acid). This process is, however, not commonly used on an industrial scale, being reserved for special applications due to the high price of potassium hydroxide.

Ion exchange processes have therefore been developed for the production of high-purity potassium nitrate or potassium phosphate. These potassium salts are formed from an inorganic potassium salt, particularly potassium chloride, and the corresponding mineral acid (nitric acid or phosphoric acid) by means of an ion exchange process. For potassium nitrate, this is described in patent documents CA 2027064 (Monomeras) and U.S. Pat. No. 3,993,466, and for potassium phosphate in EP 230 355 (AST). Beside the valuable potassium salt, the ion exchange processes also produce an impure hydrochloric acid solution, which is often regarded as waste.

Organic material can also be a source of potassium. The potassium level of plants is generally about 1 g/100 g dry matter. However, this level can vary. For sugar beet it is 1 g/100 g, for potato 1.8 g/100 g and for grass 2.54 g/100 g dry matter. Potassium often accumulates in by-products during the processing of agricultural crops. For example, during starch extraction from potatoes the potassium level in the by-product (potato thick juice) can be as high as 14 g/100 g dry matter.

Agricultural by-products, for example molasses, can be used for industrial fermentation processes. After the valuable product, for example bakers yeast, ethanol, citric acid, has been extracted from the fermentation brot, a liquid with an increased level of potassium is obtained. This liquid, the fermentation by-product, is often concentrated and called vinasse. The potassium content can be as high as 14 g/100 g dry matter.

In addition to potassium the agricultural and fermentation by-products contain valuable organic compounds such as amino acids, proteins, organic acids and sugars, and are therefore in many cases used as an ingredient in animal feed. High potassium level is, however, undesirable in animal feed because it can lead to health problems (for example hypomagnesia in cows) and increases the production of manure.

There are many examples in the literature of the partial removal of potassium from agricultural or fermentation by-products in order to increase their value as animal feed ingredients. Different technologies are described, such as crystallization, chromatography, electrodialysis and ion exchange:

- removal of potassium by crystallization is described in patent applications NL 6800310 and NL 6800313, corresponding to DE 1817550 and DE 1900242 (for molasses) and NL 9200403 (for potato thick juice);
- removal of potassium by chromatography is referred to in patent application WO 96/00776 (for vinasse);
- removal of potassium by electrodialysis is described in Int. Sugar Journal, vol. 95 (1993), pages 243–247 and
- removal of potassium by means of ion exchange is described in American Potato Journal, vol. 47 (1970), pages 326–336 (for potato juice).

The most common method used by industry for removing potassium from agricultural by-products is crystallization. Only part of the potassium can, however, be removed and about 3–6 g/100 g based on dry matter remains. The other technologies are more efficient and are able to reduce the level to 1.5 g/100 g dry substance, or even lower. Unfortunately electrodialysis and chromatography are, however, very sensitive to fouling by organic compounds and are therefore less suitable for removal of potassium from agricultural by-products on an industrial scale. Fouling can also be a serious problem in ion exchange technology, but there are several ways to prevent or reduce the effect of fouling during operation.

In the crystallization processes described, the chemical composition of the potassium-rich fraction is mainly potassium sulphate or syngenite (potassium-calcium sulphate) contaminated with organic compounds. For chromatography and electrodialysis, the main product is a mixture of organic potassium salts. For the ion exchange process, the chemical composition of the potassium-rich solution is mainly determined by the acid used for regeneration:

- When hydrochloric acid is used, a mixture of potassium chloride and hydrochloric acid is produced.
- When sulphuric acid is used, a mixture of potassium sulphate and sulphuric acid is produced.
- Regeneration with nitric acid will yield a mixture of potassium nitrate and nitric acid. However, it was thought impossible to safely regenerate the resin with nitric acid in the presence of organic compounds. The main reason is the explosion hazard described in the literature for systems containing ion-exchange resin, organic compounds and nitric acid.
- Regeneration of the ion-exchange resin with phosphoric acid will yield a mixture of potassium phosphate and phosphoric acid. Phosphoric acid is, however, known to be a rather weak acid and so not very effective in regeneration of a standard cation resin. The result is a large excess of phosphoric acid in the potassium phosphate/phosphoric acid solution. No references could be found in the literature for describing regeneration of a cation resin loaded with potassium for producing potassium phosphate.

In all the publications relating to this subject, little or no attention is given to further downstream processing of the potassium-rich fraction to increase its purity and value. The production of a high-purity potassium salt from an agricultural or fermentation by-product was considered impossible due to the large amount of organic impurities present. Further, none of the references refer to the production of high-purity potassium nitrate or potassium phosphate from an agricultural or fermentation by-product.

BRIEF DESCRIPTION OF THE INVENTION

The present invention provides a new, effective process for the production of potassium nitrate or potassium phosphate from liquid agricultural or fermentation by-products according to the attached claims. The process comprises the following unit operations: ion exchange, neutralization, concentration and crystallization. Optionally, but preferably, clarification is included as an initial step. In the present inventive process, regeneration of the ion-exchange resin is carried out with nitric acid or phosphoric acid, leading to the production of a solution of potassium nitrate/nitric acid or a solution of potassium phosphatelphosphoric acid. Highpurity potassium salts are obtained after neutralization by means of crystallizaton Due to their high purity, the potassium salts can be used in horticultural or technical applications The low-potassium by-product obtained after ion exchange can be used directly or in concentrated form for example as an ingredient in animal feed, thereby increasing its value.

The advantage of this process over existing ion exchange processes, which use an inorganic potassium salt, is that two valuable products are produced. By contrast, the existing processes produce one valuable product and one waste product, impure hydrochloric acid solution.

BRIEF DESCRIPTION OF DRAWINGS

For the better understanding of the invention, reference is made to the accompanying drawings, in which.

DETAILED DESCRIPTION OF THE INVENTION

Because the chemical and physical properties of the liquid agricultural or fermentation by-product are different from traditional inorganic potassium sources, a new process was developed for the production of potassium nitrate or potassium phosphate from the above-mentioned starting materials. In the meantime the quality of the liquid agricultural or fermentation by-product as an ingredient for animal feed is increased by lowering the potassium level below 2 g/100 g dry matter.

The process developed in accordance with this invention comprises the following unit operations: ion exchange, neutralization, concentration and crystallization.

Figure 1:
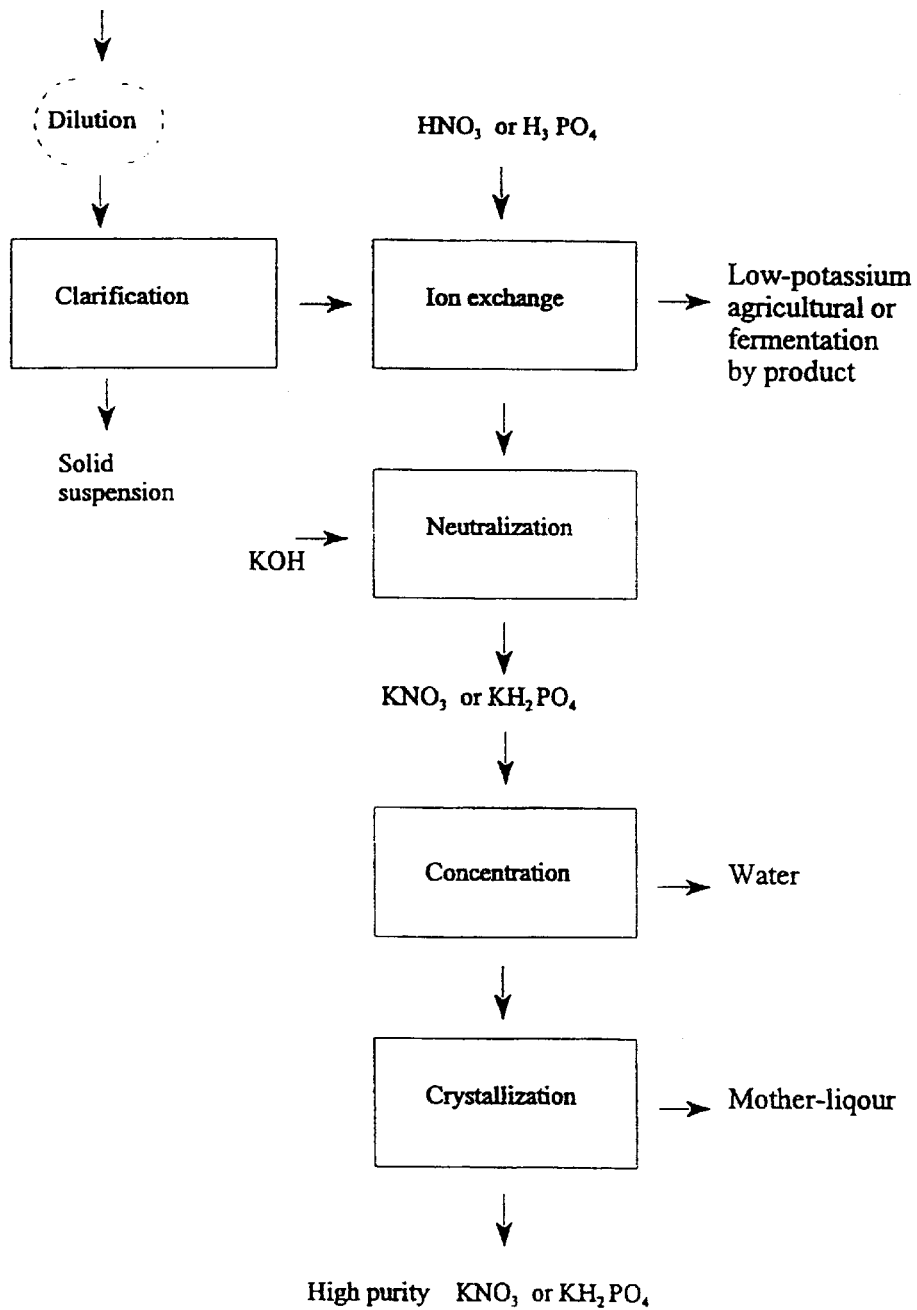
FIG. 1 is a block diagram illustrating the process of the present invention.

Preferably the process according to the present invention comprises the following unit operations which are represented schematically in FIG. 1.

Clarification of the liquid agricultural or fermentation by-product (solid-liquid separation)
Ion exchange
Neutralization
Concentration
Crystallization, centrifugation
Drying of the potassium salt Clarification: It is known that liquid agricultural and fermentation by-products can contain particles (solid proteins, cell fragments, fibres, sand, etc.). In such cases these particles have to be removed beforehand to prevent fouling and clogging of the ion-exchange resin. The particles can be removed by centrifugation, filtration, membrane filtration or other known techniques Due to the high viscosity of the agricultural by-product, it may be necessary to dilute and/or heat the solution before clarification. However, to avoid unnecessary dilution, the clarification can be integrated with the ion exchange process. This can be done by re-using the wash water, which is used for rinsing the resin after loading with potassium. The suspension containing the removed particles can be used separately or mixed with the obtained low-potassium by-product.

Ion exchange: According to this invention, the ion exchange process can be carried out in a column or a series of columns filled with particles having cation exchange properties. For the production of potassium nitrate, a strong acid cation resin should be used; for potassium phosphate, a weak acid cation resin should be used.

For the production of potassium nitrate, ion exchange conditions have been designed to ensure that the risk of explosion hazards remains extremely small. These conditions are based on:

selection of resin,
selection of temperature,
selection of nitric acid concentration,
stripping the resin with potassium hydroxide, and
continuous flow through the column to remove heat if it is being produced by an unwanted reaction.

The ion-exchange unit operation consists of the following sequential steps, which can be repeated cycle after cycle.

Loading the resin with potassium by feeding the liquid agricultural or fermentation by-product, Washing the resin with water to reduce organic compounds from the resin bed to the desired level.

Stripping the resin with potassium hydroxide solution to remove impurities (mainly ammonia and amino acids) bound to the resin.

Washing the resin with water to remove excess potassium hydroxide and stripped ammonia and aniino acids to the desired levels.

Regeneration of the resin with nitric acid or phosphoric acid to remove the potassium from the resinL Washing the resin with water to remove the potassium salt and reduce the excess acid to the desired level.

The ion-exchange process can be operated at room temperature, but the process is best performed at temperature between 30 and 60° C.

The flow rates during the different stages should be chosen to avoid a large pressure drop over the column or columns in series. Therefore the superficial velocity should not exceed 30 m/h, and should preferably be between 5 and 20 m/h.

The ion-exchange process described will produce three solutions:

low-potassium liquid agricultural or fermentation by-product solution,
strip solution and
potassium nitrate or potassium phosphate solution.

The strip solution, containing mainly ammonia, amino acids and small amount of potassium hydroxide, can be mixed with the low-potassium liquid agricultural or fermentation by-product.

Neutralization: The excess nitric or phosphoric acid used during the ion exchange process is neutralized by adding potassium hydroxide until a neutral solution is obtained. For neutralization, concentrated potassium hydroxide solution can be used to avoid dilution as much as possible. After neutralization, the concentration of the potassium-salt solution is between 15% and 20% by weight. The temperature should be high enough to prevent crystallization.

Concentration: The potassium-salt solution is concentrated, preferably by evaporation at reduced pressure, to a concentration between 35% and 65% by weight.

Crystallization: Crystallization can be performed by cooling or evaporation at a given temperature or by a combination of both (flash evaporation). After crystallization, the crystals can be separated by means of filtration or centrifugation. Washing of the crystal-cake is necessary to remove interstitial mother-liqour, which contains impurities. The crystals can be dried in any suitable drying system.

The invention will be further described with reference to the following working examples:

EXAMPLES

1. Materal and methods

1.1 Material

Potato thick juice (Avebe, Holland, 57.2% by weight, 8.66% potassium). Potato thick juice is a by-product of potato starch production and contains most of the soluble organic and inorganic compounds present in the potato.

Vinasse (Nedalco, Holland, 60/a by weight, 8.78% potassium). Vinasse is a by-product of alcohol production by fermentation of molasses.

Nitric acid (technical quality, 53% by weight)
Phosphoric acid (technical quality, 50% by weight)
Potassium hydroxide (technical quality, 25% by weight)
Demineralized water from Demi-instailation (Christ Holland)
Amberlite 200 C (Rohm & Haas, USA)

1.2 Equipment

Counter current ion exchange equipment
ISEP-L-100 with heat-isolated columns
Number of columns: 30
Length of column: 1 metre
Total resin volume: 27.3 litres
(AST, Florida, USA)
Counter current ion exchange equipment ISEP-L100-C
Number of columns: 30
Length of column: 1.07 metre
Total resin volume: 126.3 litre
(AST-Florida, USA)
Heat exchanger (AST, Florida, USA)
Separator: NA-7. Westfalia (Germany)

1.3 Analyses

All analyses (pH, density, dry substance, potassium, nitrate, ortho-phosphate and total organic carbon: TOC) were carried out according to standard analytical methods.

Example 1

Potassium Nitrate from Potato Thick Juice

Potato thick juice was diluted to 30 Brix It was then heated to 50° C. and then clarified using a separator. Starting with 100 kg of potato thick juice, 91 kg of water was then added. After clarification, 162.3 kg of clear potato juice and 28.7 kg of solid suspension were obtained. This clear solution was evaporated to 58% by weight thus having 81 kg of clear potato thick juice.

Figure 2:
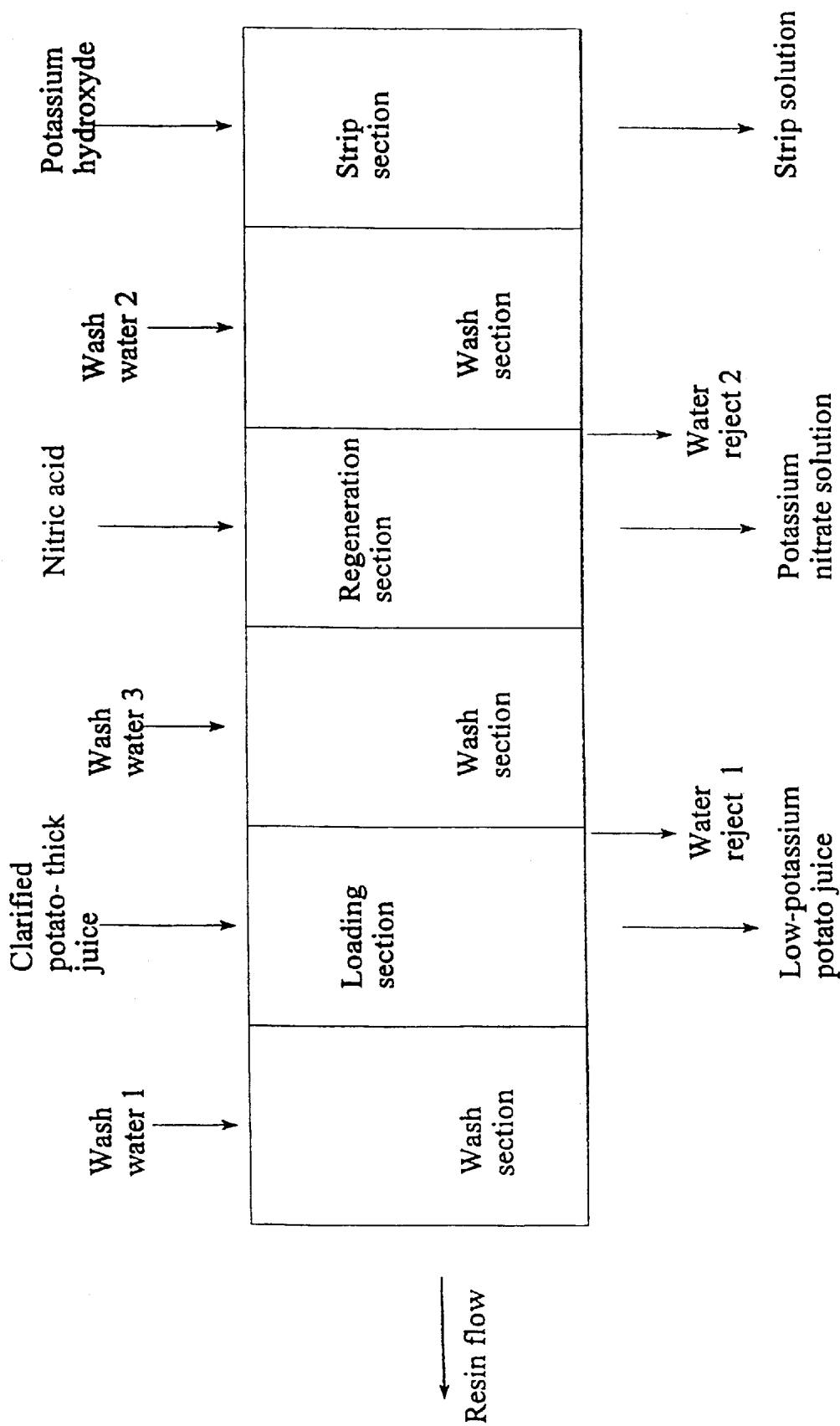
FIG. 2 illustrates the basic configuration of an ISEP ion exchange unit ton potassium nitrate.

Potassium was removed from the clear potato thick juice with an ISEP unit and using the basic principle of loading, washing, regeneration, etc., as shown in FIG. 2. The columns of the ISEP unit were filled with a strong acid cation exchange resin, Amberlite 200 C. The resin was rinsed thoroughly with water at 50° C. to clean and heat the columns before the experiment was started. All liquid solutions and wash water during the experiment were heated to 50° C. before entering the ISEP unit. In this way the temperature in the columns was maintained at 35–45° C.

For the incoming and outgoing flows, see Table 1 and 2. The mass balance for dry matter and potassium is also given, based on actual analyses.

Table 2 shows that potassium was removed very efficiently from the potato thick juice and that it was recovered as potassium nitrate by regeneration of the resin.

The potassium-nitrate solution containing some nitric acid was neutralized with potassium hydroxide solution (25% by weight) to pH 7. The total organic carbon (TOC) was 0.85% by weight. This corresponds to approximately 2% by weight of amino acids. The solution was concentrated in a Rotavapor to approximately 60% by weight, and then cooled to 35–40° C. by vacuum, thus inducing crystal formation. After 15 minutes of crystallization at 35–40° C., the crystal suspension was filtered. The crystalcake was then washed with cold water (4° C.) and the crystals obtained were dried in a stove with a final temperature of 130° C. The crystals were then analysed (see Table 3).

As seen from Table 3, the crystals were very pure, the TOC level of the dried crystals being below the detection limit (1 ppm). It is therefore demonstrated that crystallization is a very effective way of removing the remaining organic material. The amount of sodium and chloride is also much lower than that of the commercially available high-purity potassium nitrate.

TABLE 1

Potassium removal from potato thick juice
Incoming flows of ion exchanger

| Incoming flows | flow (l/hr) | mass (kg/hr) | dry subst. (kg ds/hr) | Potassium (kg/hr) |
|---|---|---|---|---|
| Clarified potato thick juice conc. = 58% ds density = 1.34 kg/l | 6.00 | 8.04 | 4.66 | 0.73 |
| Wash water 1 (density = 0.998) | 24.14 | 24.09 | — | — |
| KOH-solution conc. = 25% ds density = 1.24 kg/l | 0.42 | 0.52 | 0.13 | 0.09 |
| Wash water 2 (density = 0.998) | 21.22 | 21.8 | — | — |
| HNO$_3$-solution conc. = 53% ds density = 1.335 kg/l | 2.73 | 3.65 | 1.94 | — |
| Wash water 3 (density = 0.998) | 2.93 | 21.89 | — | — |
| Total | 76.44 | 79.37 | 6.73 | 0.82 |

TABLE 2

Potassium removal from potato thick juice
Outgoing flows of ion exchanger

| Outgoing flows | flow (l/hr) | mass (kg/hr) | dry subst. (kg ds/hr) | Potassium (kg/hr) |
|---|---|---|---|---|
| Low potassium potato thick juice conc. = 3.3% ds density = 1.06 kg/l | 21.02 | 22.28 | 2.96 | 0.01 |
| Water reject 1 (density = 0.998) | 9.14 | 9.2 | — | — |
| Strip solution conc. = 1.6% ds density = 1.003 kg/l | 2.82 | 21.89 | 0.35 | 0.01 |
| $KNO_3$-solution conc. = 4.8% ds density = 1.098 kg/l | 6.80 | 8.45 | 2.73 | 0.82 |
| Water reject 2 (density = 0.998) | 7.55 | 7.54 | — | — |
| Total | 76.33 | 79.28 | 6.04 | 0.84 |

TABLE 3

Quality of $KNO_3$ from potato thick juice in comparison with commercial sample KNO3

| | $KNO_3$ Protamylasse | $KNO_3$ Commercial sample | Unit w/w % |
|---|---|---|---|
| Potassium | 38.4 | 38.9 | w/w % |
| Nitrate* | 60.7 | 60.2 | w/w % |
| Sodium | 2 | 478 | ppm |
| Chloride | 70 | 4980 | ppm |
| TOC | absent | absent | |

*based on analyses of nitrogen

Example 2

Potassium Nitrate from Vinasse

Vinasse was diluted to 30 Brix, heated to 50° C. and then clarified using a Westfalia separator.

Staring with 100 kg of vinasse, 123 kg of water was added. After clarification, 190 kg of clear diluted vinasse and 33 kg of solid suspension were obtained.

Potassium was removed from the clear diluted vinasse with an ISEP unit and using the basic principle of loading, washing, regeneration, etc as shown in FIG. 2. The columns of the ISEP unit were filled with strong acid cation exchange resin Amberlite 200C. The resin was rinsed thoroughly with water at 50° C. to clean and heat up the columns before the experiment was started All liquid solutions and wash-water during the experiment were heated to 50° C. before entering the ISEP unit. In this way the temperature in the columns was maintained at 35–45° C.

For the incoming and outgoing flows, see Tables 4 and 5 The mass balance given for dry matter and potassium is based on actual analyses.

Table 5 shows that potassium was removed very efficiently from the diluted vinasse and was recovered as potassium nitrate by regeneration of the resin.

The potassium-nitrate solution containing some, nitric acid was neutralized with potassium hydroxide solution (25% by weight) to pH 7. The solution was concentrated in a Rotavapor to approximately 60% by weight and then cooled to 35–40° C. by vacuum, thus inducing crystal formation. After 15 minutes of crystallization at 35–40° C., the crystal suspension was filtered. The crystal cake was then washed with cold water (4° C.) and the crystals dried in a stove with a final temperature of 130° C. The crystals were then analysed (see Table 6).

As seen from Table 6, the crystals were very pure, the TOC level of the dried crystals being below the detection limit (1 ppm). The amount of sodium and chloride is also much lower than that of the commercially available high-purity potassium nitrate.

TABLE 4

Potassium removal from vinasse
Incoming flows of ion exchanger

| Incoming flows | flow (l/hr) | mass (kg/hr) | dry subst. (kg ds/hr) | Potassium (kg/hr) |
|---|---|---|---|---|
| Clarified vinasse conc. = 29% ds density = 1.17 kg/l | 13.15 | 15.38 | 4.46 | 0.62 |
| Wash water 1 (density = 0.998) | 24.13 | 24.08 | — | — |
| KOH-solution conc. = 25% ds density = 1.24 kg/l | 0.55 | 0.68 | 0.17 | 0.12 |
| Wash water 2 (density = 0.998) | 21.77 | 21.73 | — | — |
| $HNO_3$-solution conc. = 53% ds density = 1.335 kg/l | 2.68 | 3.58 | 1.90 | — |
| Wash water 3 (density = 0.998) | 23.26 | 22.79 | — | — |
| Total | 85.54 | 88.24 | 6.53 | 0.74 |

TABLE 5

Potassium removal from vinasse
Outgoing flows of ion exchanger

| Outgoing flows | flow (l/hr) | mass (kg/hr) | dry subst. (kg ds/hr) | Potassium (kg/hr) |
|---|---|---|---|---|
| Acid solution conc. = 1.4% ds density = 1.043 kg/l | 28.13 | 29.34 | 3.34 | 0.02 |
| Water reject 1 (density = 0.998) | 9.55 | 9.53 | — | — |
| Strip solution conc. = 1.1% ds density = 1.003 kg/l | 24.06 | 24.13 | 0.26 | 0.02 |
| $KNO_3$-solution conc. = 5.0% ds density = 1.099 kg/l | 15.44 | 16.95 | 2.54 | 0.70 |
| Water reject 2 (density = 0.998) | 8.99 | 8.97 | — | — |
| Total | 86.7 | 88.92 | 6.4 | 0.74 |

TABLE 6

Quality of $KNO_3$ from vinasse in compare with commercial sample KNO3

| | $KNO_3$ Vinasse | $KNO_3$ Commercial sample | Unit w/w % |
|---|---|---|---|
| Potassium | 38.8 | 38.9 | w/w % |
| Nitrate* | 60.4 | 60.2 | w/w % |
| Sodium | 18 | 478 | ppm |
| Chloride | 60 | 4980 | ppm |
| TOC | absent | absent | |

*based on analyses of nitrogen

Example 3

Potassium Di-hydrogen Ortho-phosphate ($KH_2PO_4$) from Potato Thick Juice

Figure 3:
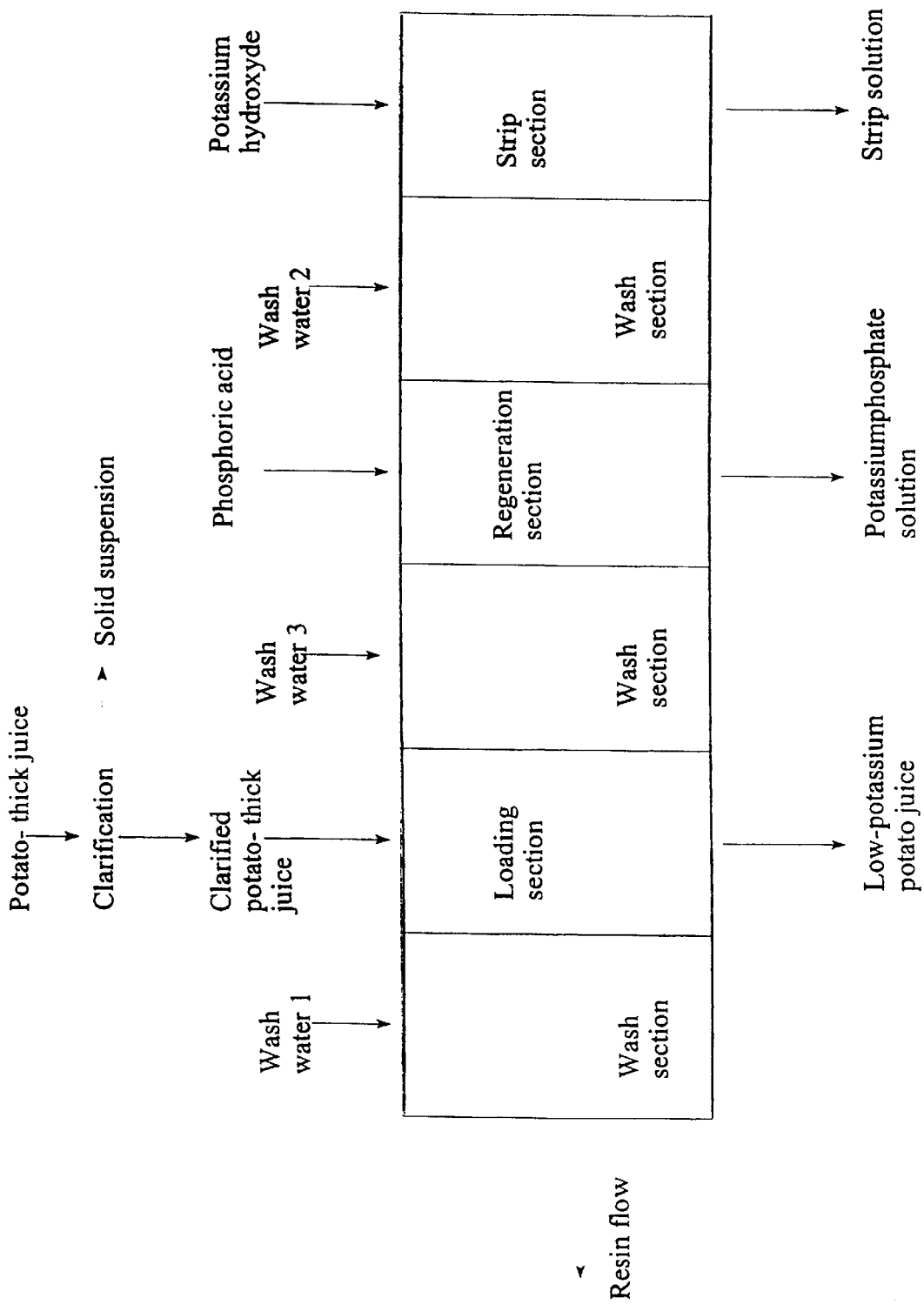
FIG. 3 illustrates the basic configuration of an ISEP ion exchange unit for potassium phosphate.

Potassium was removed from potato thick juice with ISEP L-100-C unit using the basic principles of loading, washing, regeneration etc as shown in FIG. 3. The columns of the ISEP unit were filled with a strong acid cation resin, Amberlite 200C. The resin was rinsed thoroughly with water at 50° C. to clean and heat the columns before the experiment was started. All liquid solutions and wash water during the experiments used were heated to 50° C. and the ISEP-unit was placed in a so called hot-box. In this way the temperature in the columns was maintained at 45–50° C.

The incoming potato thick juice was diluted in-fine with the wash water coming from the ISEP unit (wash water 1) and clarified in-line using a Westfalia separator. The clear potato thick juice, having a concentration of approx. 15 Brix (the Brix scale refers to the percentage by weight of sucrose in solution) entered the loading section of the ISEP unit.

For the incoming and outgoing flows see table 7 and 8. The mass balance for dry matter and potassium is also given based on actual analyses. Table 8 shows that a large amount of potassium was removed from the potato thick juice and was recovered as potassium di-hydrogen ortho-phosphate by regeneration of the resin.

The potassium di-hydrogen orthophosphate solution, still containing some phosphoric acid, was neutralized with potassium hydroxide solution (25% by weight) to pH=4.7. This solution was concentrated in a Rotavapor to 40% by weight and then cooled to 20° C. by vacuum and cooling water, thus inducing crystal formation. After 30 minutes of crystallization at 20° C. the crystal suspension was filtered. The crystal cake was then washed with cold water (4° C.) and the crystals obtained were dried in a stove with a final temperature 110° C. The crystals were then analyzed (see table 9).

As can be seen from table 9 the crystals were very pure. The TOC level of the dried crystals is below the detection limit (10 ppm). The amount of sodium and chloride present is in the same order as the commercially available high-purity potassium, di-hydrogen ortho-phosphate.

TABLE 7

Potassium removal potato thick juice
Incoming flows of ion exchanger

| Incoming flows | flow (l/hr) | mass (kg/hr) | dry subst. (kg ds/hr) | Potassium (kg/hr) |
|---|---|---|---|---|
| Potato thick juice Conc. = 57.2% ds density = 1.34 kg/l | 11.45 | 15.34 | 8.77 | 1.33 |
| Wash water 1 (density = 0.998 kg/l) | 46.1 | 46.0 | — | — |
| KOH-solution Conc. = 11.8% ds density = 1.11 kg/l | 2.63 | 2.92 | 0.34 | 0.24 |
| Wash water 2 (density = 0.998 kg/l) | 39.7 | 39.6 | — | — |
| $H_3PO_4$-solution conc. = 50% ds density = 1.34 kg/l | 6.53 | 8.75 | 4.38 | — |
| Wash water 3 (density = 0.998 kg/l) | 65.2 | 65.1 | — | — |
| Total | 71.61 | 177.7 | 13.49 | 1.57 |

TABLE 8

Potassium removal potato thick juice
Outgoing flows of ion exchanger

| Incoming flows | flow (l/hr) | mass (kg/hr) | dry subst. (kg ds/hr) | Potassium (kg/hr) |
|---|---|---|---|---|
| Solid suspension conc. = 17.8% ds density = 1.09 kg/l | 12.93 | 4.09 | 2.51 | 0.32 |
| Low-potassium potato thick juice conc. = 9.9% ds density = 1.04 kg/l | 47.94 | 49.86 | 4.94 | 0.32 |
| Strip solution conc. = 0.9% ds density = 1.00 kg/l | 37.23 | 37.23 | 0.34 | 0.02 |
| $KH_2PO_4$-solution conc. = 6.94% ds density = 1.04 kg/l | 71.75 | 74.62 | 5.18 | 0.87 |
| Total | 169.85 | 75.80 | 12.97 | 1.53 |

TABLE 9

Quality of $KH_2PO_4$ from potato thick juice
in comparison with commercial sample $KH_2PO_4$

|  | $KH_2PO_4$ Potato thick juice | $KH_2PO_4$ Commercial sample | Unit w/w % |
|---|---|---|---|
| Potassium | 29.5 | 28.5 | w/w % |
| Ortho-phosphate | 23.2 | 23 | w/w % |
| Sodium | 1100 | 920 | ppm |
| Chloride | 210 | 40 | ppm |
| TOC | absent | absent |  |

Although the invention has been described with regard to its preferred embodiments, which constitute the best mode presently known to the inventors, it should be understood that various changes and modifications as would be obvious to one having the ordinary skill in this art may be made without departing from the scope of the invention which is set forth in the claims appended hereto.

What is claimed is:

1. A process for producing high-purity potassium salts using agricultural or fermentation by-products, wherein said process comprises the following sequential steps:
    (a) loading a cation exchange resin with potassium by feeding an agricultural or fermentation by-product containing potassium and organic compounds,
    (b) stripping the resin to form a potassium containing solution,
    (c) neutralizing the potassium containing solution,
    (d) concentrating the neutralized solution, and
    (e) crystallizing the high-purity potassium salt from the concentrated solution obtained in step (d).

2. A process according to claim 1, wherein the high-purity potassium salt is potassium nitrate or potassium phosphate.

3. A process according to claim 2, wherein the ion exchange unit operation comprises the following sequential steps: loading, washing, stripping, washing, regeneration and washing.

4. A process according to claim 3, wherein the ion-exchange unit operation comprises the following sequential steps:
    loading of the cation exchange resin with potassium by feeding an agricultural or fernentation by-product,
    washing the loaded resin with water,
    stripping the washed resin with a potassium hydroxide solution, washing the stripped resin with water, regenerating the washed resin with nitric acid or phosphoric acid solution and washing the regenerated resin with water.

5. A process according to claim 2, wherein the liquid agricultural or fermentation by-product is clarified before it is fed to the ion exchange unit operation.

6. A process according to claim 2, wherein the neutralization unit operation is carried out by adding a potassium hydroxide solution to achieve a neutral pH.

7. A process according to claim 2, wherein the concentration unit operation yields a potassium nitrate or potassium phosphate solution with concentration between 35% and 65% dry matter.

8. A process according to claim 2, wherein the crystallization unit operation is carried out by cooling and/or evaporation.

9. A process according to claim 2, wherein the liquid agricultural by-product is a potassium containing solution obtained during industrial processing of an agricultural crop.

10. A process according to claim 2, wherein the liquid fermentation by-product is a potassium containing solution obtained from an industrial fermentation process.

11. A process according to claim 2, wherein a high-purity potassium nitrate or potassium phosphate contains impurities of less than 1% dry matter.

12. A process for producing an ingredient for animal feed with reduced potassium content, wherein the process uses a liquid agricultural or fermentation by-product as its potassium source and comprises the following sequential unit operations:

(a) loading a cation exchange resin with potassium by feeding an agricultural or fermentation by-product containing potassium and organic compounds, (b) stripping the resin to form a potassium containing solution, (c) neutralizing the potassium containing solution, (d) concentrating the neutralized solution, and (e) crystallizing a high-purity potassium salt from the concentrated solution obtained in step (d), thereby producing a liquid agricultural or fermentation by-product having reduced potassium content which contains an ingredient for animal feed.

* * * * *